(12) United States Patent
Yokotani (10) Patent No.: US 11,437,795 B2
(45) Date of Patent: Sep. 6, 2022

(54) COVER DEVICE FOR CASE OPENING

(71) Applicant: SUMITOMO WIRING SYSTEMS, LTD., Yokkaichi (JP)

(72) Inventor: Koichi Yokotani, Yokkaichi (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 266 days.

(21) Appl. No.: 16/933,929

(22) Filed: Jul. 20, 2020

(65) Prior Publication Data
US 2021/0036496 A1    Feb. 4, 2021

(30) Foreign Application Priority Data
Jul. 29, 2019 (JP) .............................. JP2019-138508

(51) Int. Cl.
*H02G 3/08* (2006.01)
*B60R 16/03* (2006.01)

(52) U.S. Cl.
CPC .............. *H02G 3/083* (2013.01); *B60R 16/03* (2013.01)

(58) Field of Classification Search
CPC .......... H02G 3/08; H02G 3/081; H02G 3/083; H02G 15/076
USPC ......................................... 220/3.8; 439/527
See application file for complete search history.

(56) References Cited

U.S. PATENT DOCUMENTS

| | | | | |
|---|---|---|---|---|
| 7,134,918 B2* | 11/2006 | Wang | .................... | H01R 12/722 |
| | | | | 439/677 |
| 2007/0076374 A1* | 4/2007 | Mongia | ................. | H01L 23/473 |
| | | | | 257/E23.098 |
| 2015/0050833 A1* | 2/2015 | Mizutani | ................. | B60L 50/16 |
| | | | | 439/527 |
| 2018/0316142 A1 | 11/2018 | Yokotani | | |

FOREIGN PATENT DOCUMENTS

| | | |
|---|---|---|
| CN | 101317265 A | 12/2008 |
| CN | 108291572 A | 7/2018 |
| CN | 109196964 A | 1/2019 |
| JP | 2017092418 A | 5/2017 |
| WO | WO-2017014055 A1 * | 1/2017 ........... H01R 13/512 |

OTHER PUBLICATIONS

Office Action in corresponding Chinese Patent Application No. 202010673795.8 dated Jun. 24, 2021.

* cited by examiner

*Primary Examiner* — King M Chu
(74) *Attorney, Agent, or Firm* — Loza & Loza, LLP (57) ABSTRACT

A cover device for a case opening includes a coupled member, which is coupled to a case, and a cover, which includes a cover main body, a first screw fixing piece, and a second screw fixing piece. The cover main body includes a ceiling and a wall. The first screw fixing piece and the second screw fixing piece extend outward from different positions adjacent to the cover main body. The coupled member includes a plurality of projections. The projections include a first projection and a second projection that are located at opposite sides of a hypothetical line connecting (Continued)

screw holes of the first screw fixing piece and the second screw fixing piece. In a state in which the cover main body is covering the coupled member, the first projection and the second projection contact an inner surface of the wall in a direction orthogonal to the hypothetical line.

5 Claims, 3 Drawing Sheets

COVER DEVICE FOR CASE OPENING

BACKGROUND

Field of the Disclosure

The present disclosure relates to a cover device for a case opening.

Related Art

Japanese Laid-Open Patent Publication No. 2017-92418 discloses a closing structure that includes a cover and a device case. The device case includes a case wall and a shield connector. The shield connector is coupled to the case wall. The shield connector includes an opening used for assembling tasks. The cover closes the opening. The cover includes a bolt-fastened coupling plate. The case wall includes a positioning pin, which contacts the coupling plate to restrict rotation of the cover.

SUMMARY

It is desired that rotation of the cover be effectively restricted.

Accordingly, it is an objective of exemplary embodiments of the present disclosure to effectively restrict rotation of the cover.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a cover device for a case opening is coupled to a case having an opening. The cover device includes a coupled member and a cover. The coupled member is coupled to the opening of the case. The cover covers the opening and includes a cover main body, a first screw fixing piece, and a second screw fixing piece. The cover main body includes a ceiling and a wall. The ceiling covers the coupled member from a side opposite to the case. The wall at least partially surrounds a periphery of the coupled member. The first screw fixing piece includes a first screw hole, and the second screw fixing piece includes a second screw hole. The first screw fixing piece and the second screw fixing piece extend outward from different positions adjacent to the cover main body. The coupled member includes a plurality of projections. The plurality of projections includes a first projection and a second projection that are located at opposite sides of a hypothetical line connecting the first screw hole and the second screw hole. In a state in which the cover main body is covering the coupled member, the first projection and the second projection contact an inner surface of the wall in a direction orthogonal to the hypothetical line.

The exemplary embodiments of the present disclosure effectively restrict rotation of the cover.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Embodiments of the present disclosure will now be described.

A cover device for a case opening of the present disclosure is as described below.

(1) The cover device for a case opening is coupled to a case having an opening. The cover device includes a coupled member and a cover. The coupled member is coupled to the opening of the case. The cover covers the opening and includes a cover main body, a first screw fixing piece, and a second screw fixing piece. The cover main body includes a ceiling and a wall. The ceiling covers the coupled member from a side opposite to the case. The wall at least partially surrounds a periphery of the coupled member. The first screw fixing piece includes a first screw hole, and the second screw fixing piece includes a second screw hole. The first screw fixing piece and the second screw fixing piece extend outward from different positions adjacent to the cover main body. The coupled member includes a plurality of projections. The plurality of projections includes a first projection and a second projection that are located at opposite sides of a hypothetical line connecting the first screw hole and the second screw hole. In a state in which the cover main body is covering the coupled member, the first projection and the second projection contact an inner surface of the wall in a direction orthogonal to the hypothetical line. In a state in which the cover main body is covering the coupled member, the first projection and the second projection contact an inner surface of the wall in a direction orthogonal to the hypothetical line. In this state, rotation of the case is restricted regardless of which one of the first screw hole and the second screw hole is fastened first by a screw.

(2) The inner surface of the wall may include a flat portion. At least one of the first projection and the second projection may contact the flat portion. At least one of the first projection and the second projection stably contacts the flat surface portion. This stably restricts rotation of the cover.

(3) The plurality of projections may include a third projection and a fourth projection located at separate positions in a direction parallel to the hypothetical line. In a state in which the cover main body is covering the coupled member, the third projection and the fourth projection may contact the inner surface of the wall from opposite sides in the direction parallel to the hypothetical line. In a state in which the cover main body is covering the coupled member, the third projection and the fourth projection contact the inner surface of the wall from opposite sides in the direction parallel to the hypothetical line. This fixes the position of the cover in the direction parallel to the hypothetical line.

(4) At least one of portions of the cover main body where the first screw fixing piece and the second screw fixing piece extend outward may include a reinforcement portion that is recessed at an inner side and projected outward. At least one of the third projection and the fourth projection may be fitted in a recess at the inner side of the reinforcement portion. At least one of the first screw fixing piece and the second screw fixing piece is reinforced by the reinforcement portion. Further, at least one of the third projection and the fourth projection is fitted in the recess at the inner side of the reinforcement portion. This restricts rotation of the cover.

(5) The wall may include a drain surface that forms a drain passage for water in a state in which the cover is coupled to the case. At least one projection of the plurality of projections may contact the drain surface. The at least one projection may contact part of the drain surface in a widthwise direction of the drain surface. Even in a case where the projections contact the drain surface, the projections contact part of the drain surface in the widthwise direction of the drain surface. Thus, the drain passage will not be blocked by the projections and water is drained out along the drain surfaces.

A specific example of the cover device for a case opening of the present disclosure will now be described with reference to the drawings. The present invention is not limited to the illustrated embodiments and intended to be defined by the claims and their equivalents, and all variations within the scope of the claims and their equivalents.

Embodiment 1

Figure 1:
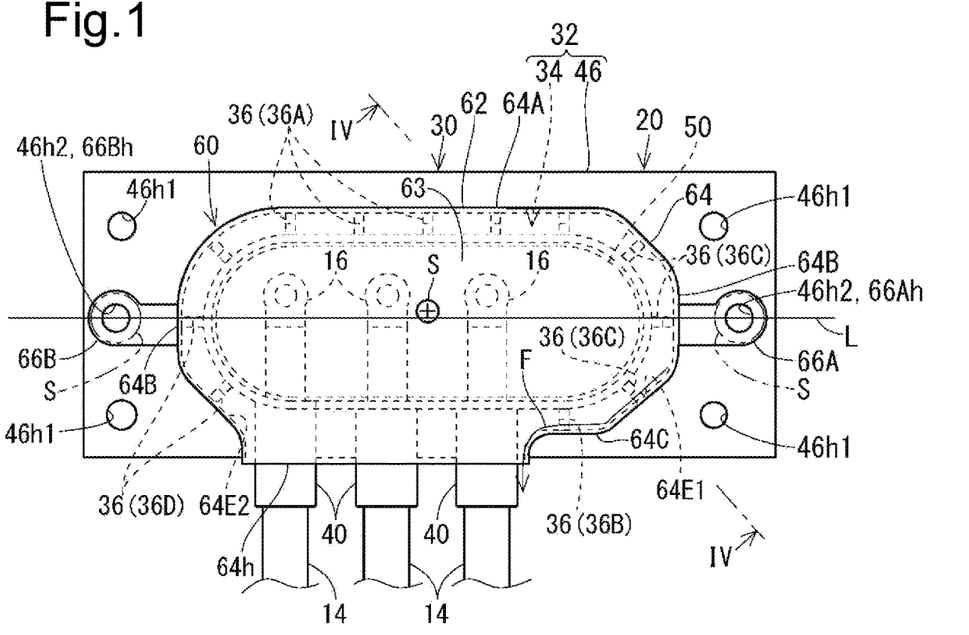
FIG. 1 is a plan view showing a connector structure.
Figure 2:
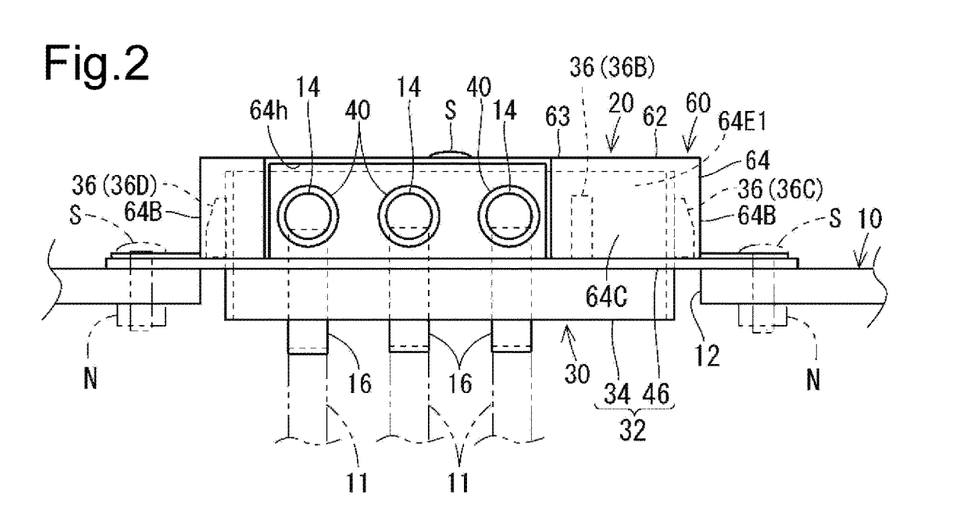
FIG. 2 is a front view showing the connector structure.

A cover device for a case opening in accordance with embodiment 1 will now be described. In the present example, the cover device for a case opening is applied to a connector structure that is coupled to an opening of a case. FIG. 1 is a plan view showing a connector structure 20. FIG. 2 is a front view showing the connector structure 20.

In the present embodiment, the connector structure 20 serving as the cover device for a case opening is coupled to a case 10 that includes an opening 12 (refer to FIG. 2). The connector structure 20 includes a coupled member 32 and a cover 60. The coupled member 32 is coupled to a portion of the case 10 where the opening 12 is formed. The opening 12 is an elliptic hole. The opening 12 may be a circular or rectangular hole. The cover 60 is a member that covers the opening 12. In this case, the cover 60 is a member that covers the opening 12 with at least part of the coupled member 32. Hereafter, the connector structure 20 will be described as a structure suited for covering an elliptic opening. The connector structure is shaped in accordance with the opening so as to properly close the opening.

The coupled member 32 holds ends of linear bodies 14 in a state in which terminals 16 attached at the end of the linear bodies 14 are connectable with terminals 11 in the case 10. In other words, the terminals 11 are located at the inner side of the opening 12 in the case 10 (partially shown in FIG. 2). Each linear body 14 is, for example, an electric wire. More specifically, each linear body 14 is an electric wire that forms a power supply line of a vehicle. Each terminal 16 is attached to the end of corresponding linear body 14 through crimping, welding, or the like. The coupled member 32 holds the ends of the linear bodies 14. Further, the coupled member 32 holds the terminals 16 at the end of the linear bodies 14 at fixed positions. The coupled member 32 is coupled to the case 10 at the portion corresponding to the opening 12 so that the terminals 16 oppose the terminals 11 located inside the case 10. Then, the terminals 11 and 16 are connected by screws or the like to electrically connect the linear bodies 14 via the terminals 16 to the terminals 11. This electrically connects the linear bodies 14 to an electric component located inside the case 10. The terminal at the end of each linear body may be fitted with the corresponding terminal located inside the case by a male-female fitting structure.

Further, the cover 60 is formed from metal or the like and serves as a shield cover that electromagnetically shields the opening 12. The cover 60 electromagnetically shields the ends of the linear bodies 14 and the connecting portions of the terminals 16 and the terminals 11. The cover 60 can be removed to perform, for example, maintenance on the components inside the case 10.

In the present embodiment, the cover device for an opening is applied to a connector structure but does not necessarily have to be applied to a connector structure. For example, the cover device for an opening is applicable to a structure in which a coupled member is coupled to close an opening without holding linear body ends and terminals.

Figure 3:
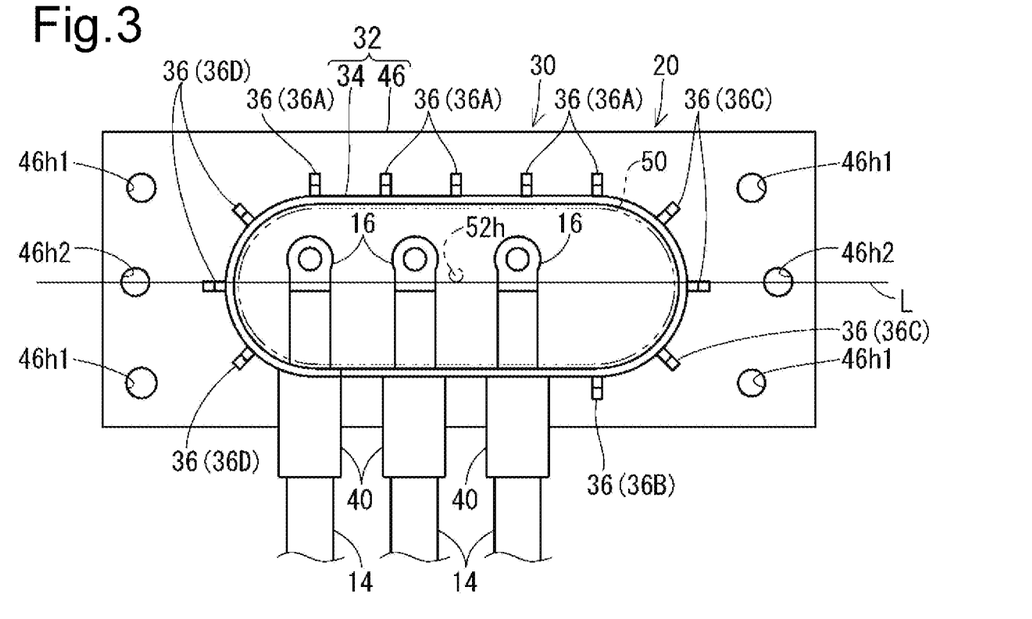
FIG. 3 is a plan view showing the connector structure without a cover.
Figure 4:
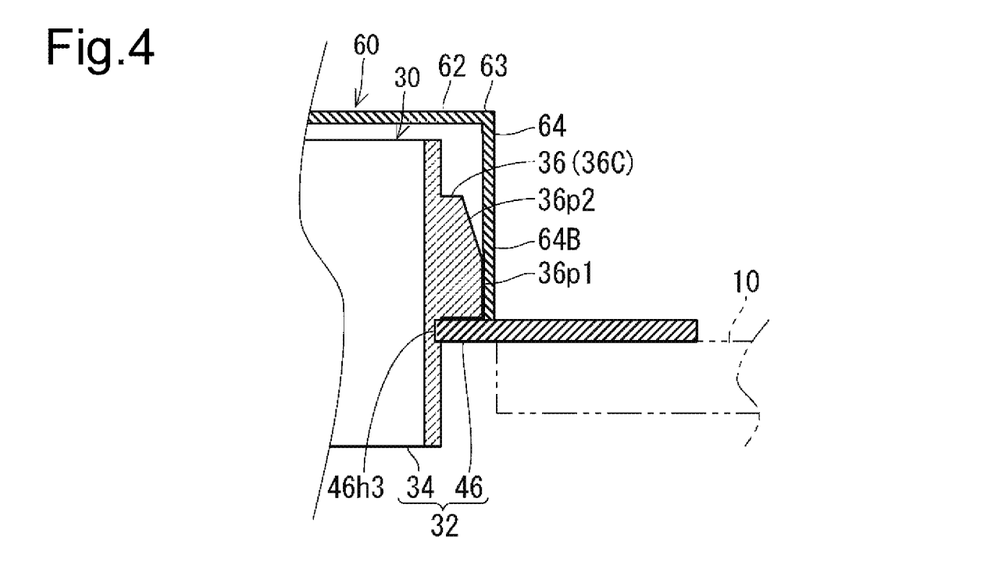
FIG. 4 is a partially cross-sectional view taken along line IV-IV in FIG. 1.

The connector structure 20 will now be described in detail. FIG. 3 is a plan view showing the connector structure 20 without the cover 60. FIG. 4 is a partially cross-sectional view taken along line Iv-Iv in FIG. 1.

The coupled member 32 is coupled to the case 10. A lid member 50 is fitted in the coupled member 32 to close the opening 12.

The coupled member 32 includes a wall 34 and a coupled portion 46.

The wall 34 is tubular and shaped in correspondence with the edge of the opening 12. Here, the wall 34 is shaped as a short elliptic tube. In a state in which the coupled member 32 is coupled to the opening 12, the wall 34 extends along the edge of the opening 12.

The wall 34 defines an opening. In a state in which the coupled member 32 is coupled to the case 10, in a plan view, the opening of the wall 34 is located inside the opening 12 of the case 10. This opening allows tasks, such as screw-fastening tasks, to be performed to connect respective distal ends of the terminals 16 and the terminals 11.

A plurality of projections 36 is formed on the wall 34. The projections 36 will be described later in association with the relationship with the cover 60. In the description hereafter, the projections 36 may be classified as a first projection 36A, a second projection 36B, a third projection 36C, or a fourth projection 36D.

The wall 34 includes holders 40 that project outward from one of the long sides of the wall 34. Each holder 40 holds one end of a linear body 14 and a basal end of the corresponding terminal 16 at fixed positions. The holders 40 are shaped to be cylindrical and arranged in parallel projecting from one of the long sides of the wall 34. The plurality of (three in present example) linear bodies 14 has ends arranged in parallel and held to be directed toward the wall 34 from the outer side of the holders 40. Further, the terminals 16 at the ends of the linear bodies 14 have basal ends arranged in parallel and held by respective holders 40. Each terminal 16 extends from the end of the corresponding linear body 14 into the wall 34 and is bent inside the wall 34 toward one end of the wall 34 (inner side of case 10). The distal end of the bent portion is further bent to be orthogonal to an axial direction of the wall 34 at a position outside the opening at the one end of the wall 34. In a state in which the coupled member 32 is coupled to the portion corresponding to the opening 12 of the case 10, the distal end of each terminal 16 is held inside the case 10 in a manner allowing for planar contact with the corresponding terminal 11 inside the case 10. This overlaps the distal end of each terminal 16 and the corresponding terminal 11, and the two terminals 11 and 16 are electrically and mechanically connected with each other by a screw or the like.

The coupled portion 46 is formed by a metal plate. Further, the wall 34 and the holders 40 are resin-molded portions. The wall 34 and the holders 40, which are formed from resin, are integrally formed with the coupled portion 46, which is formed from metal, in a state in which the coupled portion 46 is partially embedded in the wall 34.

The coupled portion 46 is formed, for example, by pressing a sheet of metal. The coupled portion 46 is rectangular. The coupled portion 46 includes thread insertion holes 46$h$1 and 46$h$2. Four thread insertion holes 46$h$1 are formed in the vicinity of the four corners of the coupled portion 46. Two thread insertion holes 46$h$2 are formed near the two short sides of the coupled portion 46 at the middle with respect to the extension direction of the short sides of the coupled portion 46. Further, the coupled portion 46 includes an opening 46$h$3 that is formed in correspondence with the wall 34. The wall 34 and the holders 40 are molded using the edge of the opening 46$h$3 as an insert to integrate the coupled portion 46 and the wall 34.

The thread insertion holes 46$h$1 are used to couple the coupled member 32 to the case 10. For example, in a state in which threaded rods projecting from the case 10 are inserted through the thread insertion holes 46$h$1, nuts are fastened to the threaded rods. Alternatively, the case 10 includes nuts having threaded holes aligned with the thread insertion holes 46$h$1. A screw is inserted through each thread insertion hole 46$h$1 and fastened to the corresponding nut. In a state in which the coupled member 32 is coupled to the case 10, the wall 34 is located inside the opening 12 of the case 10. The thread insertion holes 46$h$2 are used to couple the cover 60.

The lid member 50 is formed from resin or the like and closes the interior of the wall 34 (refer to FIG. 3). More specifically, the lid member 50 has an outer circumferential surface that is shaped in correspondence with an inner surface of the wall 34. That is, the lid member 50 is plate-like and includes an elliptic outer circumferential surface. An elastic seal formed from rubber or the like is arranged on the circumference of the lid member 50. In a state in which the lid member 50 is attached to the inner side of the wall 34, the opening in the wall 34 is closed. In this manner, the coupled member 32 and the lid member 50 are combined to form a member 30 that closes the opening 12 of the case 10. A threaded hole 52$h$ is formed in a portion of the lid member 50 directed toward the outside (refer to FIG. 3). The threaded hole 52$h$ is a blind hole that is open toward the outside. The threaded hole 52$h$ is used to fasten the cover 60 to the lid member 50 with a screw.

The cover 60 covers the opening 12 and at least part of the coupled member 32 and includes a cover main body 62, a first screw fixing piece 66A, and a second screw fixing piece 66B. The cover 60 is formed from metal to serve as an electromagnetic shield. Pressing or the like is performed on a metal plate to integrally form the cover 60. In a case where the purpose of the cover 60 is to provide protection from the exterior, the cover 60 may be formed from resin or the like.

The cover main body 62 covers at least part of the coupled member 32. The cover main body 62 includes a ceiling 63 and a wall 64. In a plan view, the ceiling 63 extends over the entire wall 34. The ceiling 63 is shaped as a circular plate that is elongated in a longitudinal direction of the wall 34. The ceiling 63 includes a screw hole. A screw S is inserted through the screw hole and fastened to the threaded hole 52$h$ of the lid member 50 to couple the lid member 50 to the cover 60. When the lid member 50 is coupled to the cover 60, the cover 60 and the lid member 50 can be removed together for maintenance or the like. The lid member 50 coupled to the cover 60 serves as a service cover, and the service cover serves to close the opening 12.

The wall 64 extends around the ceiling 63 from next to where the linear bodies 14 extend outward to one of the long sides of the ceiling 63. The cover 60 covers the opening 12 in a state in which the ceiling 63 covers the coupled member 32 from a side opposite to the case 10 and the wall 64 covers at least part of the periphery of the coupled member 32. More specifically, the wall 64 includes a long wall portion 64A, two side wall portions 64B, and a partial wall portion 64C.

The long wall portion 64A covers, from the outer side, the long side of the wall 34 at a side opposite to where the linear bodies 14 extend outward. The long wall portion 64A is shaped as an elongated plate and includes a flat inner surface. The two side wall portions 64B are arranged to be continuous with two ends of the long wall portion 64A, respectively. Each side wall portion 64B is arcuate and bulged outward. The side wall portions 64B cover the two longitudinal ends of the wall 34 from the outer side. The partial wall portion 64C covers part of the long side of the wall 34 at the side where the linear bodies 14 extend outward. In other words, the linear bodies 14 are arranged closer to one side (left side in FIG. 1) of the wall 34 in the longitudinal direction. The partial wall portion 64C is continuous with the side wall portion 64B located at the other side (right side wall portion in FIG. 1). At the side where the linear bodies 14 extend outward, the partial wall portion 64C covers, from the outer side, a portion of the long side of the wall 34 that is closer to the other side (rightward in FIG. 1) in the longitudinal direction. The partial wall portion 64C includes a flat plate portion including a flat inner surface. An opening 64$h$ is defined between the partial wall portion 64C and the side wall portion 64B at one side of the longitudinal direction (left side wall portion in FIG. 1) allowing the linear bodies 14 to extend outward.

The inner surface of a portion of the side wall portion 64B that is continuous with the partial wall portion 64C includes an inclined surface 64E1 that extends toward a longitudinally middle part of the wall 64 and outward in the direction in which the linear bodies 14 extend. The inner surface of a portion of the other side wall portion 64B that is located at the side of the opening 64$h$ where the linear bodies 14 extend outward includes an inclined surface 64E2 that extends toward a longitudinally middle part of the wall 64 and outward in the direction in which the linear bodies 14 extend.

A case where the connector structure 20 is coupled to the case 10 with the linear bodies 14 extending downward will now be described. When water forms inside the cover 60 due to condensation or the like, the water can move on the inner surface of the cover 60 and be drained out of the opening 64*h*. Particularly, in the wall 64, water is smoothly moved on a drain passage F formed by the inclined surfaces 64E1 and 64E2 of the side wall portions 64B (refer to FIG. 1) and drained out of the opening 64*h*. The inclined surfaces 64E1 and 64E2 are examples of drain surfaces forming the drain passages for the water and are gradually inclined downward with respect to the gravitational direction as the inclined surfaces 64E1 and 64E2 become closer to the opening 64*h*.

The first screw fixing piece 66A and the second screw fixing piece 66B extend outward from separate locations adjacent to the cover main body 62. Here, the first screw fixing piece 66A and the second screw fixing piece 66B respectively extend outward from middle parts of the two side wall portions 64B of the wall 64. The first screw fixing piece 66A and the second screw fixing piece 66B extend in opposite directions from the cover main body 62.

The first screw fixing piece 66A and the second screw fixing piece 66B each have the form of an elongated plate. The first screw fixing piece 66A has a distal end including a first screw hole 66A*h*, and the second screw fixing piece 66B has a distal end including a second screw hole 66B*h*. In a state in which the cover 60 is placed on the coupled member 32, the first screw hole 66A*h* of the first screw fixing piece 66A and the second screw hole 66B*h* of the second screw fixing piece 66B are aligned with the thread insertion holes 46*h*2 of the coupled member 32.

The cover 60 is coupled to the case 10 using the first screw hole 66A*h* and the second screw hole 66B*h*. For example, the case 10 includes a nut N aligned with the thread insertion hole 46*h*2. A screw S is inserted through the thread insertion hole 46*h*2 and the first screw hole 66A*h* (or second screw hole 66B*h*) and fastened to the nut N. Alternatively, the case 10 includes a threaded rod that is inserted through the thread insertion hole 46*h*2 and the first screw hole 66A*h* (or second screw hole 66B*h*). A nut is fastened to the threaded rod. In this manner, the cover 60 is coupled to the case 10 in a state in which the cover 60 covers at least part of the coupled member 32.

If the screw S is fastened in a state in which the head of the screw S is in contact with the first screw fixing piece 66A (or second screw fixing piece 66B), the cover 60 may rotate about the screw axis. The cover 60 may also rotate in the same manner when the nut is fastened to the threaded rod. In order to restrict rotation of the cover 60, for example, when fastening the screw S, the following structure is employed.

As described above, the coupled member 32 includes the projections 36. When a hypothetical line L extends between the first screw hole 66A*h* and the second screw hole 66B*h*, the projections 36 include the first projections 36A and the second projection 36B that are located at opposite sides of the hypothetical line L. Here, a plurality of (five in present example) first projections 36A is arranged on a longitudinal portion of the wall 34 at the side opposite to where the linear bodies 14 extend outward. The first projections 36A are arranged in intervals in a direction in which the hypothetical line L extends. The first projections 36A extend outward from the outer surface of the wall 34 in a direction orthogonal to the hypothetical line L. The second projection 36B is arranged at the side of the wall 34 where the linear bodies 14 extend outward. The second projection 36B extends from the outer surface of the wall 34 orthogonally to the hypothetical line L toward the side opposite to the first projections 36A.

In the direction orthogonal to the hypothetical line L, the distance between the distal end of the first projections 36A and the distal end of the second projection 36B is set to be the same as the distance between the inner surface of the long wall portion 64A and the inner surface of the partial wall portion 64C. In a state in which the cover 60 is placed on the coupled member 32, the first projections 36A contact the inner surface of the long wall portion 64A in the direction orthogonal of the hypothetical line L. Particularly, the first projections 36A contact the flat portion of the inner surface on the long wall portion 64A. The second projection 36B contacts the inner surface of the partial wall portion 64C in the direction orthogonal to the hypothetical line L. Particularly, the second projection 36B contacts the flat portion of the inner surface on the partial wall portion 64C. The first projections 36A and the second projection 36B contact the inner surface of the wall 64 from opposite sides in the direction orthogonal to the hypothetical line L. There may be only one first projection. There may be more than one second projection.

In this manner, movement of the cover 60 is restricted in the direction orthogonal to the hypothetical line L. Thus, when the screw S inserted through the first screw fixing piece 66A (or second screw fixing piece 66B) is fastened, rotation of the cover 60 is restricted about the first screw fixing piece 66A (or second screw fixing piece 66B).

The projections 36 include the third projections 36C and the fourth projections 36D. The third projections 36C are located at positions separate from the fourth projection 36D in the direction of the hypothetical line L.

Here, the third projections 36C are arranged on the outer circumference of one longitudinal end of the wall 34. The third projections 36C (three in present example) are arranged in intervals on the outer circumference of the wall 34 at one longitudinal end. One of the third projections 36C is located at an inner side of the first screw fixing piece 66A.

The fourth projections 36D are arranged on the outer circumference at the other longitudinal end of the wall 34. The fourth projections 36D (three in present example) are arranged in intervals on the outer circumference of the wall 34 at the other longitudinal end. One of the fourth projections 36D is located at the inner side of the second screw fixing piece 66B.

In a state in which the cover 60 is covering the coupled member 32, the third projections 36C contact the inner surface of one of the side wall portions 64B. The fourth projections 36D contact the inner surface of the other side wall portion 64B. The third projections 36C and the fourth projections 36D contact the inner surfaces of the side wall portions 64B from opposite sides in the direction of the hypothetical line L. Thus, the cover 60 is fixed in position in the direction of the hypothetical line L. There may be only one third projection 36C. There may be only one fourth projection 36D.

The projections 36 may be in contact with the inner surface of the wall 64 over the entire wall 64 in a widthwise direction. Alternatively, the projections 36 may be in contact with part of the wall 64 in the widthwise direction.

Here, each projection 36 is shaped so as to contact part of the inner surface of the wall 64 in the widthwise direction of the wall 64. More specifically, each projection 36 has a portion located toward the coupled portion 46 that defines a contact portion 36*p*1 having a constant height (refer to FIG. 4). An outer surface of the contact portion 36*p*1 of the projection 36 contacts part of the inner surface of the wall 64. The projection 36 includes a portion located toward an outer end of the wall 34 defining a guide portion 36*p*2 having a height that is gradually decreased toward the outer end of the wall 34. When attaching the cover 60 to the coupled member 32, the inner surface of the wall 64 of the cover 60 can contact the outer surface of the guide portion 36p2. This guides the wall 64 to a proper position surrounding the wall 34. In a state in which the cover 60 covers the coupled member 32, the guide portion 36p2 of the projection 36 is not in contact with the inner surface of the wall 64.

Particularly, some of the third projections 36C and the fourth projections 36D of the projections 36 are in contact with the inclined surfaces 64E1 and 64E2, which serve as the drain surfaces. However, the third projections 36C and the fourth projections 36D are respectively in contact with part of the inclined surfaces 64E1 and 64E2 in the widthwise direction of the inclined surfaces 64E1 and 64E2. Thus, water moving on the inclined surfaces 64E1 and 64E2 is drained out along the inclined surfaces 64E1 and 64E2 without being blocked by the third projections 36C and the fourth projections 36D.

With the connector structure 20 including the cover device for a case opening configured as described above, in a state in which the cover main body 62 covers the coupled member 32, the first projections 36A and the second projection 36B, which are located at opposite sides of the hypothetical line L, are in contact with the inner surface of the wall 64 in the direction orthogonal to the hypothetical line L. When the first screw fixing piece 66A is fastened, the cover 60 may rotate about the first screw hole 66Ah. However, the first projections 36A or the second projection 36B contacting the inner surface of the wall 64 restrict rotation of the cover 60. When the second screw fixing piece 66B is fastened, the cover 60 may rotate about the second screw hole 66Bh. In this case, the first projections 36A or the second projection 36B contacting the inner surface of the wall 64 restrict rotation of the cover 60 in the same manner. This restricts rotation of the case 10 regardless of which one of the first screw fixing piece 66A and the second screw fixing piece 66B is fastened first by a screw.

Particularly, the first projections 36A or the second projection 36B contact the inner surface of the wall 64 so that a force stopping rotation is received by a relatively large area. This also avoids deformation of the cover 60. Further, the first projections 36A or the second projection 36B, contacting the inner surface of the wall 64, allows a rotation stopping structure to be compact. A structure in which a positioning pin is formed on a case wall to restrict rotation as described in the patent document of background art may be used in combination.

Also, the first projections 36A and the second projection 36B stably contact the flat surface portions of the inner surfaces of the long wall portion 64A and the partial wall portion 64C. This stably restricts rotation of the cover 60.

Furthermore, the second projection 36B and the fourth projections 36D are in contact with the inner surface of the wall 64 at opposite sides in the direction extending along hypothetical line L. Thus, the position of the cover 60 is also fixed in the direction extending along the hypothetical line L. This facilitates positioning of the cover 60 and the coupled member 32, for example, alignment of the thread insertion hole 46h2 and the first screw hole 66Ah (or second screw hole 66Bh). Consequently, screw fastening is facilitated.

Further, the projections 36 are in contact with part of the wall 64 in the widthwise direction. Particularly, the third projections 36C and the fourth projections 36D are in contact with part of the inclined surfaces 64E1 and 64E2, which serve as drain surfaces, in the widthwise direction. Thus, water moving on the inclined surfaces 64E1 and 64E2 is not blocked by the third projections 36C and the fourth projections 36D, and water is smoothly drained out along the inclined surfaces 64E1 and 64E2. As a result, the projections 36 facilitate the assembling efficiency while improving the drainage performance.

Figure 5:
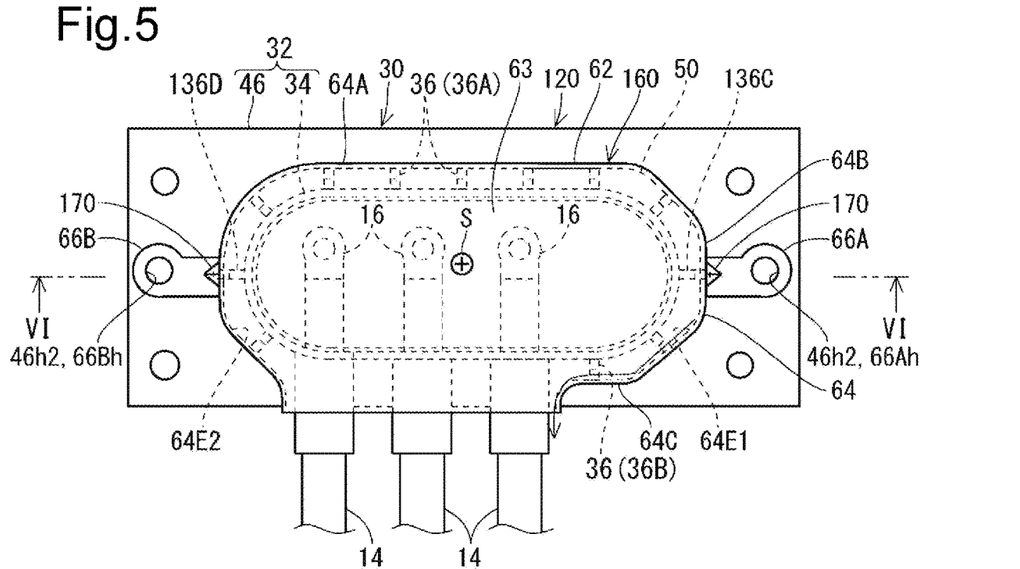
FIG. 5 is a plan view showing a connector structure of another example.
Figure 6:
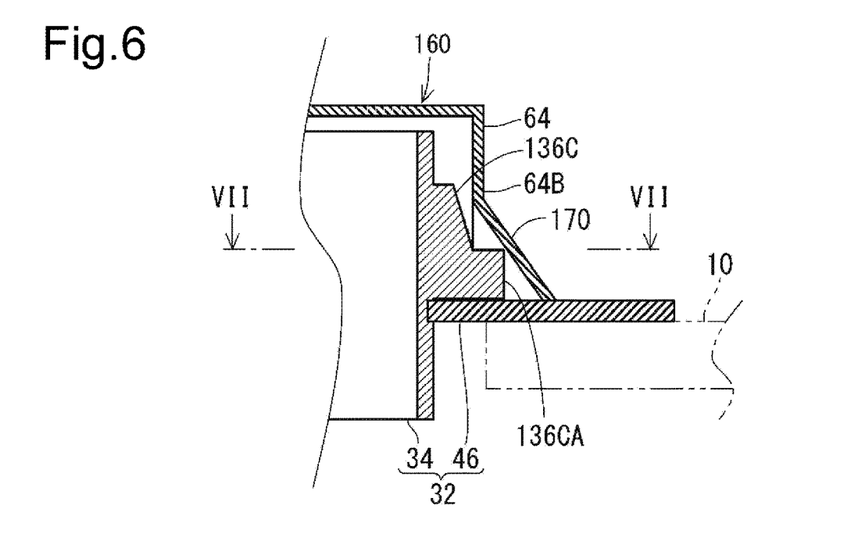
FIG. 6 is a partially cross-sectional view taken along line VI-VI in FIG. 5.
Figure 7:
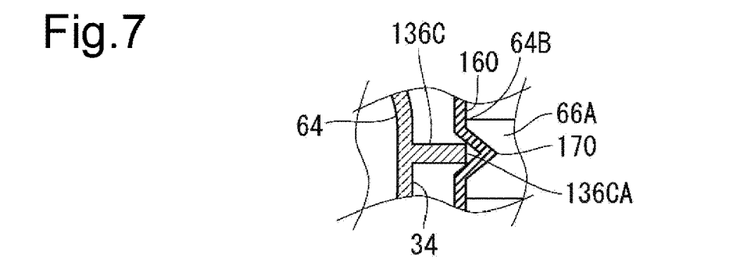
FIG. 7 is a cross-sectional view taken along line VII-VII in FIG. 6.

FIG. 5 is a plan view showing a connector structure 120 of another example. FIG. 6 is a partially cross-sectional view taken along line VI-VI in FIG. 5. FIG. 7 is a cross-sectional view taken along line VII-VII in FIG. 6.

In the connector structure 120, a cover 160 corresponding to the cover 60 includes a reinforcement portion 170. More specifically, the reinforcement portion 170 is formed on at least one of portions of the cover main body 62 where the first screw fixing piece 66A and the second screw fixing piece 66B extend outward. In the present example, the reinforcement portion 170 is formed at a portion of the cover main body 62 where the first screw fixing piece 66A extends outward. Further, the reinforcement portion 170 is formed at a portion where the second screw fixing piece 66B of the cover main body 62 extends outward. The description hereafter will mainly focus on the reinforcement portion 170 formed at the portion where the first screw fixing piece 66A extends outward.

The reinforcement portion 170 is recessed at the inner side of the cover 160 and projected outward. More specifically, the reinforcement portion 170 is projected from the side wall portion 64B toward the first screw fixing piece 66A so that the height and width of the reinforcement portion 170 both gradually decrease as approaching the first screw fixing piece 66A. The reinforcement portion 170 is where two triangular plate-like portions are connected at a predetermined angle sharing one side. The other sides of the two triangular plate-like portions are respectively connected to the side wall portion 64B and the first screw fixing piece 66A.

The reinforcement portion 170 extends diagonally between the side wall portion 64B and the first screw fixing piece 66A. Thus, the reinforcement portion 170 serves to reinforce the first screw fixing piece 66A and keep the first screw fixing piece 66A in position with respect to the side wall portion 64B.

The shape of the reinforcement portion 170 is not limited to the above example. The reinforcement portion may be box-shaped so as to be projected outward and recessed at the inner side.

At least one of the third projection and the fourth projection is fitted in the recess at the inner side of the reinforcement portion 170. Here, a third projection 136C corresponding to the third projection 36C is fitted in the recess at the inner side of the reinforcement portion 170. The third projection 136C is shaped so that an additional projection 136CA is added to the third projection 36C. The additional projection 136CA is formed to project further outward from a portion of the third projection 36C located toward the coupled portion 46. In a state in which the cover 160 is coupled to the coupled member 32, the additional projection 136CA of the third projection 136C is fitted in the recess at the inner side of the reinforcement portion 170. This state restricts movement of the third projection 136C toward the first screw fixing piece 66A. Also, the additional projection 136CA, which is fitted in the recess in the inner side of the reinforcement portion 170, restricts movement of the third projection 136C in the direction orthogonal to the hypothetical line L. In this manner, the structure in which the additional projection 136CA is fitted in the recess in the inner side of the reinforcement portion 170 also restricts rotation of the cover 160 when the first screw fixing piece 66A (or second screw fixing piece 66B) is fastened. A fourth projection 136D corresponding to the fourth projection 36D may be formed in the same manner as the third projection 136C.

The structures described in the above embodiment and modified example can be combined as long as they are technically consistent with each other.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

DESCRIPTION OF THE REFERENCE NUMERALS 10) case, 11) terminal, 12) opening, 14) linear body, 16) terminal, 20) connector structure, 32) coupled member, 34) wall, 36) projection, 36A) first projection, 36B) second projection, 36C) third projection, 36D) fourth projection, 36$p$1) contact portion, 36$p$2) guide portion, 40) holder, 46) coupled portion, 46$h$1) thread insertion hole, 46$h$2) thread insertion hole, 46$h$3) opening, 50) lid, 52$h$) threaded hole, 60) cover, 62) cover main body, 63) ceiling, 64) wall, 64A) long wall portion, 64B) side wall portion, 64C) partial wall portion, 64E1) inclined surface, 64E2) inclined surface, 64$h$) opening, 66A) first screw fixing piece, 66A$h$) first screw hole, 66B) second screw fixing piece, 66B$h$) second screw hole, 120) connector structure, 136C) third projection, 136CA) additional projection, 136D) fourth projection, 160) cover, 170) reinforcement portion, F) drain passage, L) hypothetical line, N) nut, S) screw

What is claimed is:

1. A cover device for a case opening that is coupled to a case having an opening, the cover device, comprising:
   a coupled member coupled to the opening of the case; and
   a cover that covers the opening and includes a cover main body, a first screw fixing piece, and a second screw fixing piece, wherein
   the cover main body includes
      a ceiling covering the coupled member from a side opposite to the case, and
      a wall at least partially surrounding a periphery of the coupled member,
   the first screw fixing piece includes a first screw hole,
   the second screw fixing piece includes a second screw hole,
   the first screw fixing piece and the second screw fixing piece extend outward from different positions adjacent to the cover main body,
   the coupled member includes a plurality of projections,
   the plurality of projections includes a first projection and a second projection that are located at opposite sides of a hypothetical line connecting the first screw hole and the second screw hole, and
   in a state in which the cover main body is covering the coupled member, the first projection and the second projection contact an inner surface of the wall in a direction orthogonal to the hypothetical line.

2. The cover device for a case opening according to claim 1, wherein
   the inner surface of the wall includes a flat portion, and
   at least one of the first projection and the second projection contacts the flat portion.

3. The cover device for a case opening according to claim 1, wherein
   the plurality of projections includes a third projection and a fourth projection located at separate positions in a direction parallel to the hypothetical line, and
   in a state in which the cover main body is covering the coupled member, the third projection and the fourth projection contact the inner surface of the wall from opposite sides in the direction parallel to the hypothetical line.

4. The cover device for a case opening according to claim 3, wherein
   at least one of portions of the cover main body where the first screw fixing piece and the second screw fixing piece extend outward includes a reinforcement portion that is recessed at an inner side and projected outward, and
   at least one of the third projection and the fourth projection is fitted in a recess at the inner side of the reinforcement portion.

5. The cover device for a case opening according to claim 1, wherein
   the wall includes a drain surface that forms a drain passage for water in a state in which the cover is coupled to the case,
   at least one projection of the plurality of projections contacts the drain surface, and
   the at least one projection contacts part of the drain surface in a widthwise direction of the drain surface.

* * * * *